(12) United States Patent
Porter et al.

(10) Patent No.: US 9,851,008 B2
(45) Date of Patent: Dec. 26, 2017

(54) SEAL LAND FOR STATIC STRUCTURE OF A GAS TURBINE ENGINE

(75) Inventors: Steven D. Porter, Wethersfield, CT (US); Jonathan P. Burt, Sturbridge, MA (US); Jonathan J. Jakiel, Vernon, CT (US); Amy M. Gordon, South Windsor, CT (US); Shelton O. Duelm, Wethersfield, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 513 days.

(21) Appl. No.: 13/487,721

(22) Filed: Jun. 4, 2012

(65) Prior Publication Data
US 2013/0323045 A1 Dec. 5, 2013

(51) Int. Cl.
| F01D 11/00 | (2006.01) |
| F16J 15/08 | (2006.01) |
| F02C 7/28 | (2006.01) |
| F01D 9/02 | (2006.01) |
| F01D 11/08 | (2006.01) |

(52) U.S. Cl.
CPC .......... F16J 15/0887 (2013.01); F01D 9/02 (2013.01); F01D 11/005 (2013.01); F01D 11/08 (2013.01); F02C 7/28 (2013.01)

(58) Field of Classification Search
CPC ........ F01D 11/005; F02C 7/28; F16J 15/0887
USPC .......... 415/191, 209.2, 209.3; 277/606, 609, 277/616, 630, 637, 644
See application file for complete search history.

(56) References Cited

U.S. PATENT DOCUMENTS

| 4,384,822 | A | * | 5/1983 | Schweikl et al. | 415/137 |
| 5,215,435 | A | * | 6/1993 | Webb et al. | 277/414 |
| 5,218,816 | A | | 6/1993 | Plemmons et al. | |
| 6,464,457 | B1 | * | 10/2002 | Morgan et al. | 415/174.2 |
| 6,893,217 | B2 | * | 5/2005 | Brainch et al. | 415/189 |
| 6,916,154 | B2 | | 7/2005 | Synnott | |
| 7,094,026 | B2 | * | 8/2006 | Coign et al. | 415/189 |
| 8,104,772 | B2 | * | 1/2012 | Halling | 277/606 |
| 8,221,055 | B1 | * | 7/2012 | Liang | F01D 5/186 415/115 |
| 2004/0219014 | A1 | * | 11/2004 | Synnott | 415/209.2 |
| 2008/0145217 | A1 | * | 6/2008 | Paulino et al. | 415/209.2 |
| 2010/0074733 | A1 | * | 3/2010 | Little | 415/173.5 |
| 2010/0080699 | A1 | | 4/2010 | Pietrobon | |
| 2010/0132369 | A1 | | 6/2010 | Durocher et al. | |
| 2010/0132371 | A1 | | 6/2010 | Durocher et al. | |
| 2010/0132376 | A1 | * | 6/2010 | Durocher et al. | 60/797 |
| 2011/0057394 | A1 | * | 3/2011 | Halling | 277/312 |

(Continued)

FOREIGN PATENT DOCUMENTS

WO  2009158554 A2  12/2009

OTHER PUBLICATIONS

International Search Report and Written Opinion for PCT Application No. PCT/US2013/042966 dated Mar. 20, 2014.

(Continued)

*Primary Examiner* — Gregory Anderson
*Assistant Examiner* — Danielle M Christensen
(74) *Attorney, Agent, or Firm* — Carlson, Gaskey & Olds

(57) ABSTRACT

A seal land for a gas turbine engine can include a seal body circumferentially extending about a longitudinal centerline axis. The seal body includes at least one sealing surface that extends in a plane that is transverse to the longitudinal centerline axis.

23 Claims, 5 Drawing Sheets

(56) References Cited

U.S. PATENT DOCUMENTS

| | | |
|---|---|---|
| 2011/0081234 A1 | 4/2011 | Durocher et al. |
| 2011/0081237 A1 | 4/2011 | Durocher et al. |
| 2013/0183150 A1* | 7/2013 | Batt .......................... 415/214.1 |
| 2013/0192260 A1* | 8/2013 | Mayer ................... F01D 11/003 60/805 |

OTHER PUBLICATIONS

International Preliminary Report on Patentability for PCT Application No. PCT/US2013/042966 dated Dec. 18, 2014.
Extended European Search Report for Application No. EP 13 83 0737 dated Feb. 9, 2016.

\* cited by examiner

SEAL LAND FOR STATIC STRUCTURE OF A GAS TURBINE ENGINE

BACKGROUND

This disclosure relates to a gas turbine engine, and more particularly to a static structure that can be incorporated into a gas turbine engine.

Gas turbine engines typically include a compressor section, a combustor section and a turbine section. During operation, air is pressurized in the compressor section and is mixed with fuel and burned in the combustor section to generate hot combustion gases. The hot combustion gases are communicated through the turbine section, which extracts energy from the hot combustion gases to power the compressor section and other gas turbine engine loads.

Gas turbine engines may be assembled from numerous coaxial housings and components that must be sealed relative to one another to address pressure differentials and thermal loading that can exist between these components during gas turbine engine operation. For example, static structures, such as mid-turbine frames, ducts, vane assemblies, nozzle assemblies and the like, may need to be sealed relative to cavities that extend between the static structures and inner and outer casings of an engine static structure.

SUMMARY

A seal land for a gas turbine engine according to an exemplary embodiment of the present disclosure can include a seal body circumferentially extending about a longitudinal centerline axis. The seal body includes at least one sealing surface that extends in a plane that is transverse to the longitudinal centerline axis.

In a further embodiment of the foregoing seal land embodiment, the seal body can extend between a leading edge portion and a trailing edge portion, and the seal body is tapered between the trailing edge portion and the leading edge portion.

In a further embodiment of either of the foregoing seal land embodiments, the at least one sealing surface can be a conical surface.

In a further embodiment of any of the foregoing seal land embodiments, the at least one sealing surface can seal against a seal ring having a conical surface.

In a further embodiment of any of the foregoing seal land embodiments, the at least one sealing surface seals against a finger seal.

A static structure for a gas turbine engine according to another exemplary embodiment of the present disclosure can include at least one airfoil that extends between an inner platform and an outer platform that are circumferentially disposed about a longitudinal centerline axis of the static structure. At least one of the inner platform and the outer platform extend at a first angle relative to the longitudinal centerline axis. At least one seal land can extend from at least one of the inner platform and the outer platform. The at least one seal land includes at least one sealing surface that extends at a second angle relative to the longitudinal centerline axis. The first angle and the second angle can be transverse to the longitudinal centerline axis.

In a further embodiment of the foregoing static structure embodiment, the first angle and the second angle can be equivalent angles.

In a further embodiment of either of the foregoing static structure embodiments, a seal ring can be positioned between the at least one sealing surface and a casing of an engine static structure.

In a further embodiment of any of the foregoing static structure embodiments, the seal ring can include at least one conical sealing surface that seals against said at least one sealing surface.

In a further embodiment of any of the foregoing static structure embodiments, the at least one sealing surface can include a conical surface.

In a further embodiment of any of the foregoing static structure embodiments, the at least one seal land can be positioned at an upstream, outer diameter portion of the static structure.

In a further embodiment of any of the foregoing static structure embodiments, the at least one seal land can be positioned at an upstream, inner diameter portion of the static structure.

In a further embodiment of any of the foregoing static structure embodiments, the at least one seal land can be positioned at an aft, outer diameter portion of the static structure.

In a further embodiment of any of the foregoing static structure embodiments, the at least one seal land can be positioned at an aft, inner diameter portion of the static structure.

A gas turbine engine according to yet another exemplary embodiment of the present disclosure can include a compressor section, a combustor section in fluid communication with said compressor section, a turbine section in fluid communication with said combustor, and a static structure positioned relative to at least one of the compressor section, the combustor section and the turbine section. The static structure can include a multitude of airfoils and at least one seal land that extends from a platform of the multitude of airfoils. The platform and the at least one sealing surface can axially extend at a transverse angle relative to an engine longitudinal centerline axis of the gas turbine engine.

In a further embodiment of the foregoing gas turbine engine embodiment, the at least one sealing surface can include a conical surface.

In a further embodiment of either of the foregoing gas turbine engine embodiments, the at least one sealing surface can seal against a seal ring having a conical surface.

In a further embodiment of any of the foregoing gas turbine engine embodiments, the seal ring can be received within a groove of a casing of an engine static structure.

In a further embodiment of any of the foregoing gas turbine engine embodiments, the at least one seal land can be positioned at an aft, inner diameter portion of the static structure.

In a further embodiment of any of the foregoing gas turbine engine embodiments, the at least one seal land can extend from an inner platform of the static structure and the at least one sealing surface can be positioned at an opposite side of the at least one seal land from the inner platform.

The various features and advantages of this disclosure will become apparent to those skilled in the art from the following detailed description. The drawings that accompany the detailed description can be briefly described as follows.

DETAILED DESCRIPTION

Figure 1:
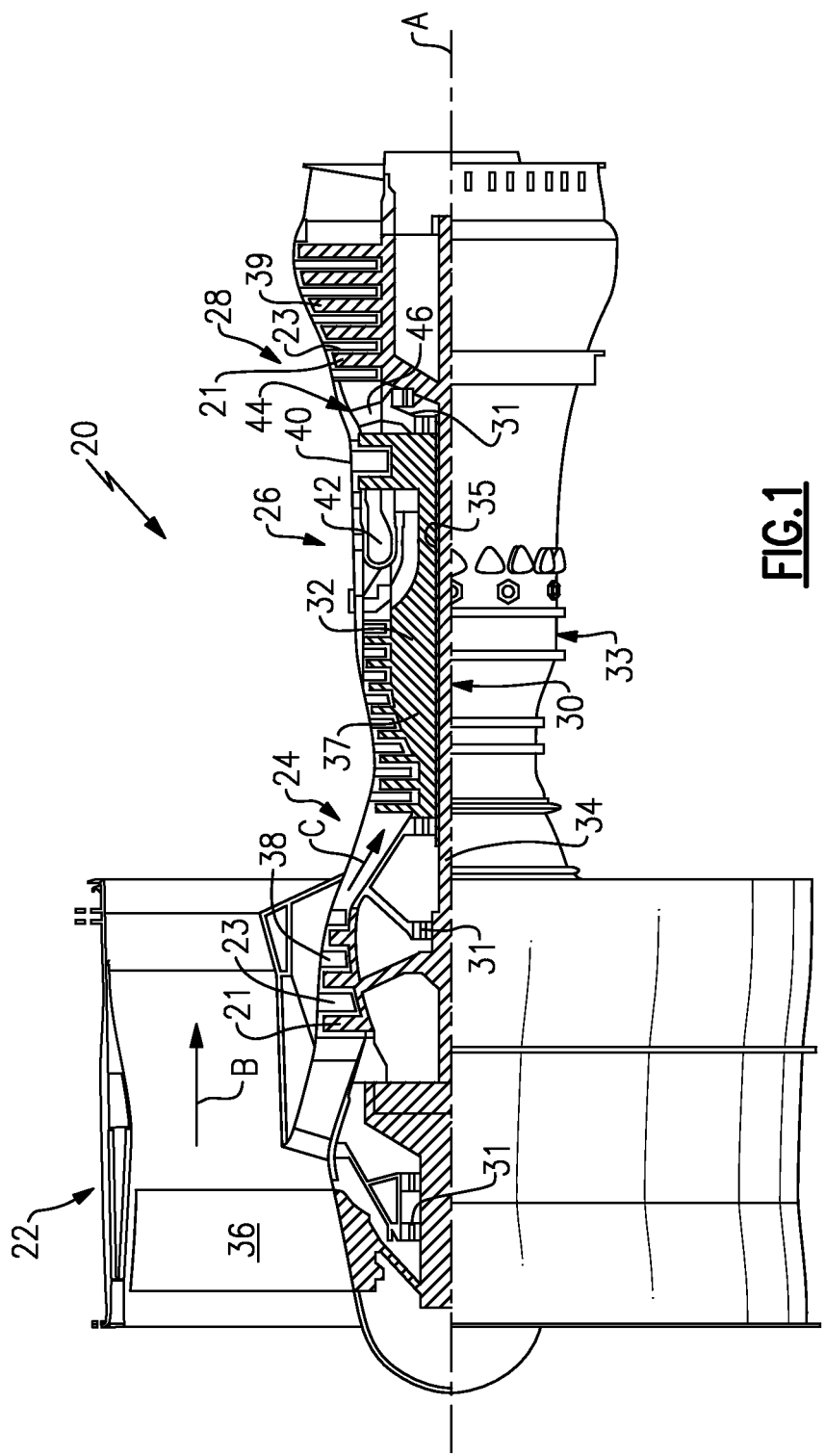
FIG. 1 illustrates a schematic, cross-sectional view of a gas turbine engine.

FIG. 1 schematically illustrates a gas turbine engine 20. The exemplary gas turbine engine 20 is a two-spool turbofan engine that generally incorporates a fan section 22, a compressor section 24, a combustor section 26 and a turbine section 28. Alternative engines might include an augmenter section (not shown) among other systems for features. The fan section 22 drives air along a bypass flow path B, while the compressor section 24 drives air along a core flow path C for compression and communication into the combustor section 26. The hot combustion gases generated in the combustor section 24 are expanded through the turbine section 28. Although depicted as a turbofan gas turbine engine in the disclosed non-limiting embodiment, it should be understood that the concepts described herein are not limited to turbofan engines and these teachings could extend to other types of engines, including but not limited to, three-spool engine architectures.

The gas turbine engine 20 generally includes a low speed spool 30 and a high speed spool 32 mounted for rotation about an engine centerline longitudinal axis A relative to an engine static structure 33 via several bearing systems 31. It should be understood that various bearing systems 31 at various locations may alternatively or additionally be provided.

The low speed spool 30 generally includes an inner shaft 34 that interconnects a fan 36, a low pressure compressor 38 and a low pressure turbine 39. The high speed spool 32 includes an outer shaft 35 that interconnects a high pressure compressor 37 and a high pressure turbine 40. In this example, the inner shaft 34 and the outer shaft 35 are supported at various axial locations by bearing systems 31 positioned within the engine static structure 33.

A combustor 42 is arranged between the high pressure compressor 37 and the high pressure turbine 40. A static structure 44 of the engine static structure 33, also referred to as a mid-turbine frame, can be arranged generally between the high pressure turbine 40 and the low pressure turbine 39. The static structure 44 can support one or more bearing systems 31 of the turbine section 28. The static structure 44 can also include one or more airfoils 46 that can be positioned within the core flow path C.

The inner shaft 34 and the outer shaft 35 are concentric and rotate via the bearing systems 31 about the engine centerline longitudinal axis A, which is co-linear with their longitudinal axes. The core airflow is compressed by the low pressure compressor 38 and the high pressure compressor 37, is mixed with fuel and burned in the combustor 42, and is then expanded over the high pressure turbine 40 and the low pressure turbine 39. The high pressure turbine 40 and the low pressure turbine 39 rotationally drive the respective low speed spool 30 and the high speed spool 32 in response to the expansion.

Figure 2:
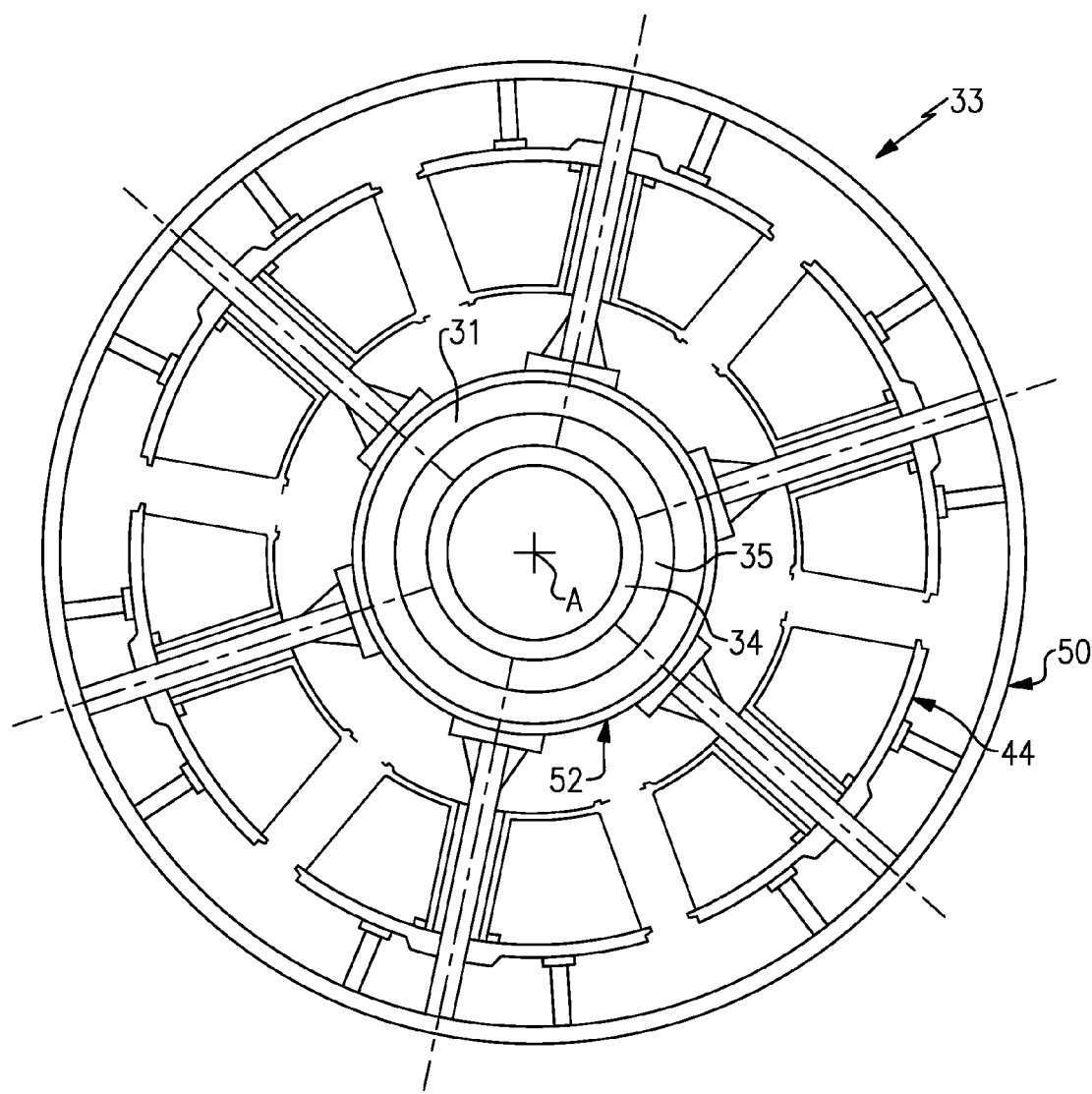
FIG. 2 illustrates a cross-section of a static structure that can be incorporated into a gas turbine engine.

FIG. 2 illustrates a static structure 44 that can be incorporated into a gas turbine engine, such as the gas turbine engine 20. In this example, the static structure 44 is a mid-turbine frame that can be positioned between the high pressure turbine 40 and the low pressure turbine 39 (See FIG. 1). However, the teachings of this disclosure are not limited to the mid-turbine frame and could extend to other static structures, including but not limited to, ducts, vane assemblies, nozzle assemblies or other full hoop ring assemblies.

The static structure 44 can be mounted to extend between an outer casing 50 and an inner casing 52 of the engine static structure 33. For example, the outer casing 50 and the inner casing 52 can be part of a turbine exhaust case of the engine static structure 33. The inner casing 52 can support a bearing system 31 as well as other components within which the inner and outer shafts 34, 35 rotate.

The static structure 44 can be mechanically attached relative to the outer casing 50 and inner casing 52 or can be thermally free relative to these structures. It should be understood that various attachment arrangements may alternatively or additionally be utilized.

Figure 3:
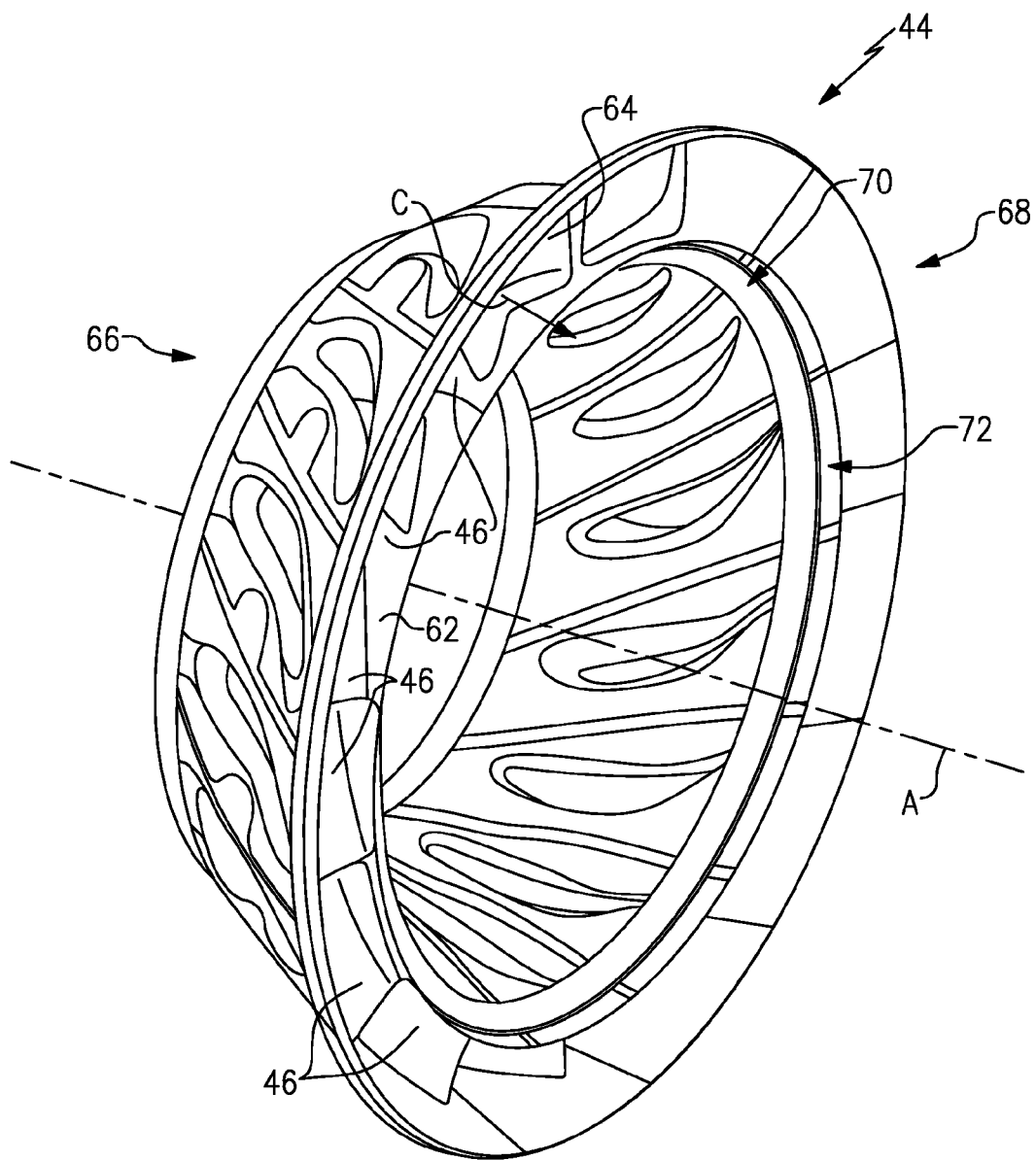
FIG. 3 illustrates a perspective view of a static structure.

Referring to FIG. 3, the exemplary static structure 44 can include a multitude of airfoils 46 that radially extend between an inner platform 62 and an outer platform 64 of the static structure 44. The multitude of airfoils 46 are axially disposed between a leading edge 66 and a trailing edge 68 of the static structure 44.

The multitude of airfoils 46 can be assembled to form an annular ring assembly that circumferentially extends about the engine centerline longitudinal axis A to define a portion of the annular core flow path C radially between the inner platform 62 and the outer platform 64 and across the multitude of airfoils 46. In other words, the inner platform 62 and the outer platform 64 establish the inner and outer boundaries of the core flow path C within the static structure 44.

The static structure 44 can include one or more sealing mechanisms, such as a seal land, that can be incorporated onto the static structure 44 to seal the static structure 44 relative to the inner casing 52 and the outer casing 50 (See FIG. 2), or other surrounding structures. In one non-limiting embodiment, the static structure 44 includes a seal land 70 that can be mounted to, integrally cast, integrally machined or integrally forged with the static structure 44 to enable sealing at one or more portions of the static structure 44, as is further discussed below.

Figure 4:
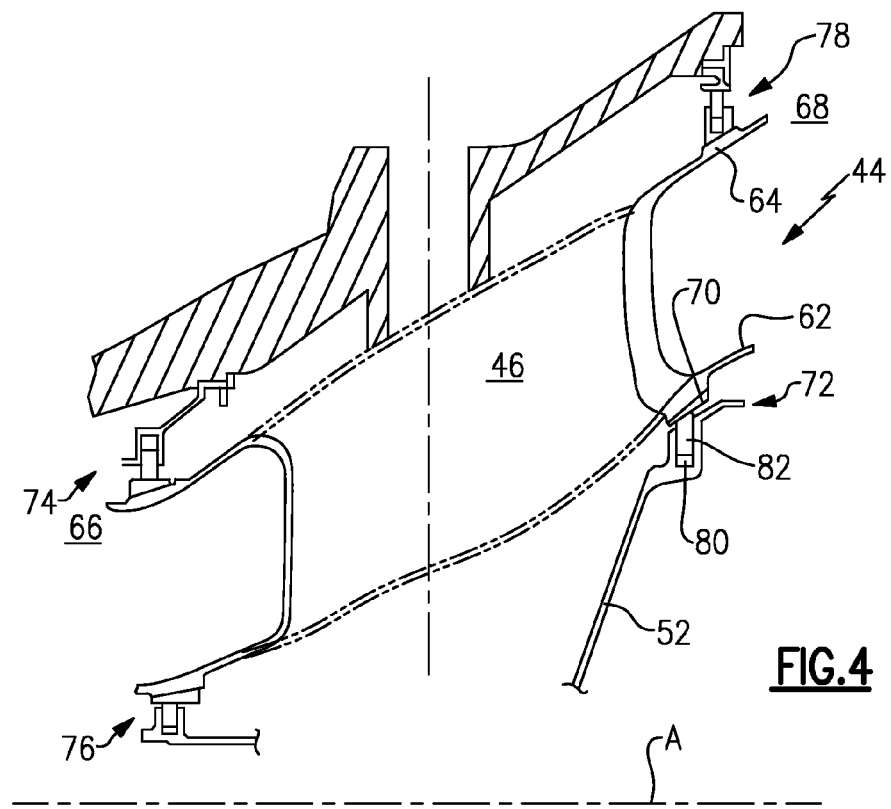
FIG. 4 illustrates a cross-sectional view of a portion of a static structure.

FIG. 4 illustrates a cross-sectional view of a portion of the static structure 44. The static structure 44 may require sealing at an upstream, outer diameter portion 74, an upstream, inner diameter portion 76, an aft, outer diameter portion 78 and/or an aft, inner diameter portion 72. Although the various features of the seal land 70 are described herein with respect to the aft, inner diameter portion 72 of the static structure 44, it should be understood that seal lands 70 could be arranged to seal one or more portions of the static structure 44, including but not limited to, the upstream, outer diameter portion 74, the upstream, inner diameter portion 76, and/or the aft, outer diameter portion 78. The seal land 70 can be circumferentially disposed about the engine centerline axis A adjacent the trailing edge 68 of the static structure 44 and at the inner platform 62 of the multitude of airfoils 46 (only one shown in FIG. 4). In other words, in this embodiment, the seal land 70 extends from the aft, inner diameter portion 72 of the static structure 44.

In one exemplary embodiment, the static structure 44, including the seal land 70, may be manufactured of a cast nickel alloy. However, it should be understood that various other materials may be utilized and may be specifically selected to match a coefficient of thermal expansion between the different parts of the static structure 44.

The seal land 70 can radially extend between the inner platform 62 and the inner casing 52 of the engine static structure 33. For example, the inner casing 52 may include a portion of a turbine exhaust case where the static structure 44 is a mid-turbine frame. However, other sections of the gas turbine engine 20 could also benefit from this disclosure.

The inner casing 52 can include a recess 80 that receives a seal ring 82 that extends radially between the seal land 70 and the inner casing 52 to seal the aft, inner diameter portion 72 of the static structure 44. The seal ring 82 could include a piston seal or any other suitable seal. In another exemplary embodiment, one or more finger seals are used in place of the seal ring 82 to seal between the seal land 70 and the inner casing 52 (See FIG. 7).

Figure 5:
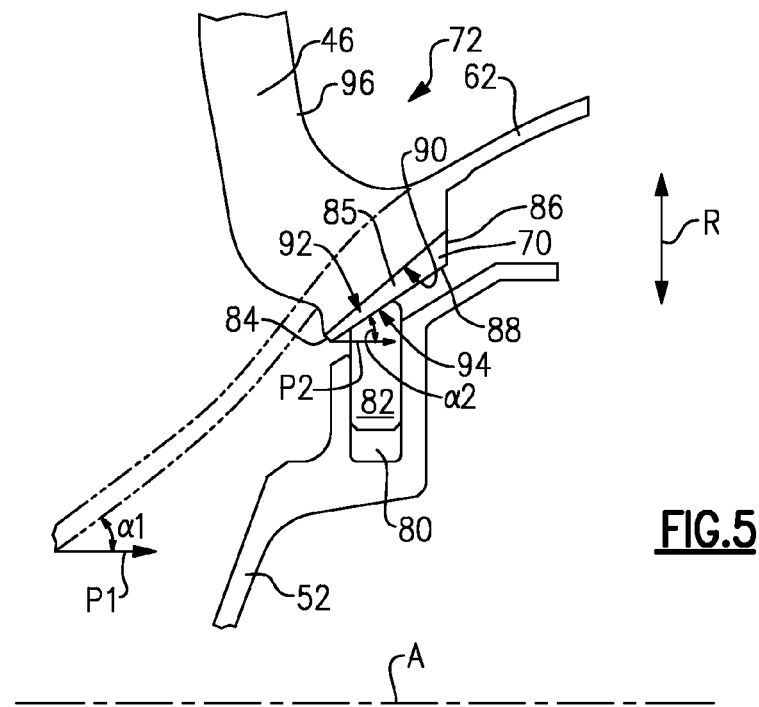
FIG. 5 illustrates an enlarged, cross-sectional view of a portion of a static structure.

FIG. 5 illustrates an enlarged view of the aft, inner diameter portion 72 of the static structure 44. The seal land 70 can extend in a radial direction R between the inner platform 62 and the inner casing 52. The exemplary seal land 70 includes a seal body 85 having a leading edge portion 84, a trailing edge portion 86, a sealing surface 88 and a second surface 90 on an opposite side of the seal body 85 from the sealing surface 88. The sealing surface 88 is positioned on an opposite side of the seal body 85 from the inner platform 62. In this exemplary embodiment, the seal body 85 is tapered in a direction that extends from the trailing edge portion 86 toward the leading edge portion 84.

The second surface 90 can provide a braze surface for mounting the seal land 70 to an inner surface 92 of the inner platform 62. However, it should be understood that other attachment arrangements may alternatively or additionally be utilized. For example, the seal land 70 could be integrally cast with the inner platform 62 such that the seal land 70 simply extends from the inner platform 62 as part of a single, monolithic structure.

In this exemplary embodiment, the sealing surface 88 and the second surface 90 axially extend at a transverse angle relative to the engine centerline longitudinal axis A. In other words, the sealing surface 88 extends in a plane that is transverse to a longitudinal centerline axis of the static structure 44. The sealing surface 88 and the second surface 90 can each include conical surfaces.

The sealing surface 88 may provide a conical sealing surface for sealing relative to the seal ring 82. It should be understood that the conical sealing surface could alternatively be positioned at a radially outer side of a platform, such as the outer platform 64, where the seal land 70 is positioned relative to either the upstream, outer diameter portion 74 or the aft, outer diameter portion 78 of the static structure (see FIGS. 4 and 6). The sealing surface 88 seals against the seal ring 82. In one embodiment, the seal ring 82 includes a conical surface 94 that can seal against the sealing surface 88 of the seal land 70.

In this exemplary embodiment, the inner platform 62 extends at a first angle α1 relative to a first longitudinal plane P1 that is parallel to the engine longitudinal centerline axis A. The sealing surface 88 can also extend at a second angle α2 relative to a second longitudinal plane P2 that is also parallel to the engine centerline longitudinal axis A. In this embodiment, the angles α1 and α2 are similar angles and can be equivalent angles. In other words, the inner platform 62 and the sealing surface 88 axially extend at substantially the same angle relative to the engine centerline axis A. In this manner, the sealing surface 88 closely matches a cone angle of the inner platform 62 of the static structure 44. Alternatively, the angles α1 and α2 can be different angles. In one exemplary embodiment, the angles α1 and α2 are between approximately 0 degrees and 60 degrees.

Figure 6:
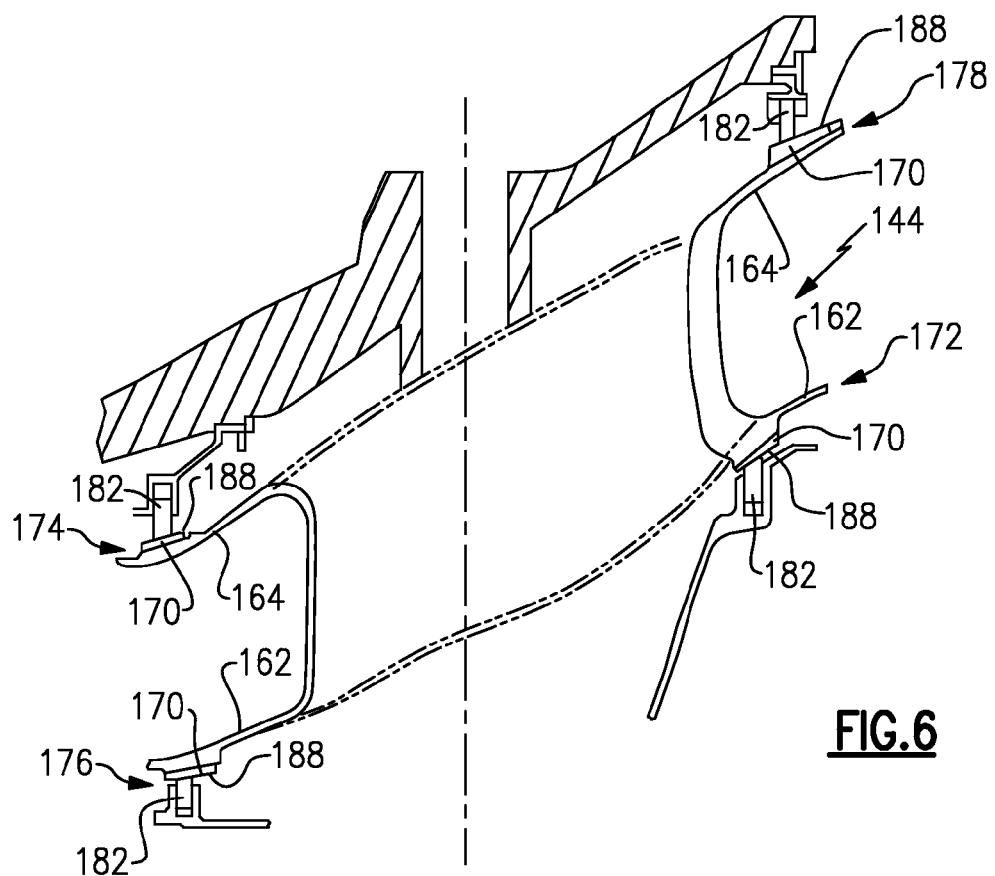
FIG. 6 illustrates another exemplary embodiment of a static structure.

FIG. 6 illustrates another exemplary embodiment of a static structure 144 that can incorporate one or more seal lands 170. In this example, each of an upstream, outer diameter portion 174, an upstream, inner diameter portion 176, an aft, outer diameter portion 178 and an aft, inner diameter portion 172 can incorporate the seal land 170 having a conical sealing surface 188 that can seal against a seal ring 182. The conical sealing surfaces 188 are disposed radially inward of the inner platform 162 at both the upstream, inner diameter portion 176 and the aft, inner diameter portion 172 and are disposed radially outward of the outer platform 164 at both the upstream, outer diameter portion 174 and the aft, outer diameter portion 178.

Figure 7:
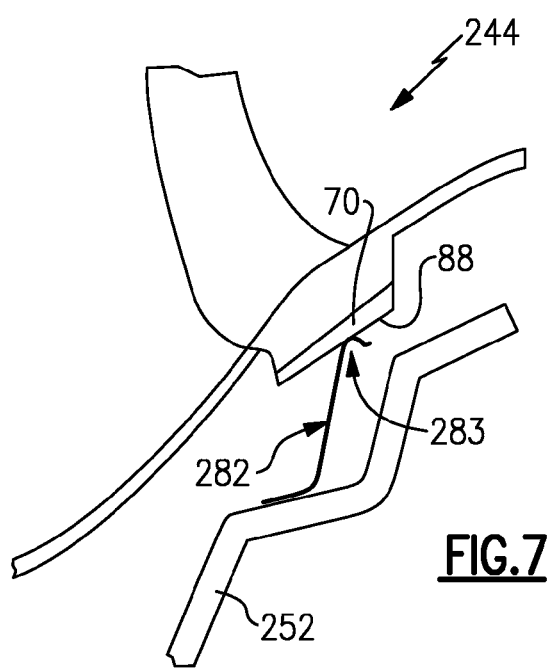
FIG. 7 illustrates yet another exemplary embodiment of a static structure.

FIG. 7 illustrates yet another example static structure 244. The exemplary static structure 244 is substantially similar to the static structure 44 detailed above; however, in this example, a finger seal 282 is used in place of the seal ring 82 to seal relative to the sealing surface 88 of the seal land 70. The finger seal 282 extends from a casing 252 of an engine static structure and contacts the sealing surface 88 of the seal land 70 to seal a portion of the static structure 244. The finger seal 282 can include a plurality of finger portions 283 that are circumferentially disposed about the engine centerline longitudinal axis A (See FIGS. 1-3).

Although the different non-limiting embodiments are illustrated as having specific components, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should also be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would recognize that various modifications could come within the scope of this disclosure. For these reasons, the following claims should be studied to determine the true scope and content of this disclosure.

What is claimed is:

1. A seal land for a gas turbine engine, comprising:
a seal body of a mid-turbine frame circumferentially extending about a longitudinal centerline axis, said seal body including a leading edge portion, a trailing edge portion, and an inner radial surface and an outer radial surface that extend between said leading edge portion and said trailing edge portion, said seal body is tapered between said trailing edge portion and said leading edge portion, wherein at least one of said inner radial surface and said outer radial surface includes at least one sealing surface in sealing contact with another sealing surface of a separate seal, and wherein both said inner radial surface and said outer radial surface of said seal body extend in a plane that is transverse to said longitudinal centerline axis.

2. The seal land as recited in claim 1, wherein said at least one sealing surface is a conical surface.

3. The seal land as recited in claim 1, wherein said at least one sealing surface seals against a seal ring having a conical surface.

4. The seal land as recited in claim 1, wherein said at least one sealing surface seals against a finger seal.

5. The seal land as recited in claim 1, wherein said seal body extends from a platform, said platform extending at a first angle relative to said longitudinal centerline axis and said at least one sealing surface extending at a second angle relative to said longitudinal centerline axis, said first angle being equivalent to said second angle.

6. The seal land as recited in claim 1, wherein said at least one sealing surface is transverse relative to said longitudinal centerline axis from said leading edge portion to said trailing edge portion of said seal body.

7. A static structure for a gas turbine engine, comprising:
at least one airfoil that extends between an inner platform and an outer platform that are circumferentially disposed about a longitudinal centerline axis of said static structure, wherein at least one of said inner platform and said outer platform extend at a first angle relative to said longitudinal centerline axis; and
at least one seal land extending from at least one of said inner platform and said outer platform, wherein said at least one seal land includes at least one sealing surface positioned at either a radially inner surface or a radially outer surface of said at least one seal land, said at least one sealing surface extending at a second angle relative to said longitudinal centerline axis, and said first angle and said second angle are transverse to said longitudinal centerline axis, and said at least one seal land including a tapering width that continuously increases in a direction from a leading edge of said at least one seal land toward a trailing edge of said at least one seal land, and wherein both said radially inner surface and said radially outer surface extend in a plane that is transverse to said longitudinal centerline axis.

8. The static structure as recited in claim 7, wherein said first angle and said second angle are equivalent angles.

9. The static structure as recited in claim 7, comprising a seal ring positioned between said at least one sealing surface and a casing of an engine static structure.

10. The static structure as recited in claim 9, wherein said seal ring includes at least one conical sealing surface that seals against said at least one sealing surface.

11. The static structure as recited in claim 7, wherein said at least one sealing surface is a conical surface.

12. The static structure as recited in claim 7, wherein said at least one seal land is positioned at an upstream, outer diameter portion of said static structure.

13. The static structure as recited in claim 7, wherein said at least one seal land is positioned at an aft, outer diameter portion of said static structure.

14. The static structure as recited in claim 7, wherein said at least one seal land is positioned at an upstream, inner diameter portion of said static structure.

15. The static structure as recited in claim 7, wherein said at least one seal land is positioned at least at an aft, inner diameter portion of said static structure.

16. The static structure as recited in claim 7, wherein said radially outer surface and said radially inner surface extend between a leading edge portion and a trailing edge portion, said at least one seal land being tapered in a direction from said trailing edge portion toward said leading edge portion.

17. A gas turbine engine, comprising:
a compressor section;
a combustor section in fluid communication with said compressor section;
a turbine section in fluid communication with said combustor;
a static structure configured as a mid-turbine frame positioned between a first portion and a second portion of said turbine section, wherein said static structure includes a multitude of airfoils and at least one seal land that extends from a platform of said multitude of airfoils, wherein said platform and at least one sealing surface of said at least one seal land axially extend at a transverse angle relative to an engine longitudinal centerline axis of the gas turbine engine, and said at least one sealing surface is in sealing contact with another sealing surface of a separate seal, and wherein a seal body of said at least one seal land is tapered between a trailing edge portion and a leading edge portion of said seal body and includes an inner radial surface and an outer radial surface that extend in a plane that is transverse to said engine longitudinal centerline axis, and wherein either the inner radial surface or the outer radial surface includes the at least one sealing surface.

18. The gas turbine engine as recited in claim 17, wherein said at least one sealing surface is a conical surface.

19. The gas turbine engine as recited in claim 17, wherein said at least one sealing surface seals against a seal ring having a conical surface.

20. The gas turbine engine as recited in claim 19, wherein said seal ring is received within a groove of a casing of an engine static structure.

21. The gas turbine engine as recited in claim 17, wherein said at least one seal land is positioned at an aft, inner diameter portion of said static structure.

22. The gas turbine engine as recited in claim 17, wherein said at least one seal land extends from an inner platform of said static structure and said at least one sealing surface is positioned at an opposite side of said at least one seal land from said inner platform.

23. The gas turbine engine as recited in claim 17, wherein said at least one sealing surface is transverse relative to said engine longitudinal centerline axis from a leading edge portion to a trailing edge portion of said at least one seal land.

* * * * *